United States Patent [19]

Harrison

[11] Patent Number: 4,859,054
[45] Date of Patent: Aug. 22, 1989

[54] PROXIMITY FUZE

[75] Inventor: Thomas R. Harrison, Stockton, Calif.

[73] Assignee: The United States of America as represented by the United States Department of Energy, Washington, D.C.

[21] Appl. No.: 71,952

[22] Filed: Jul. 10, 1987

[51] Int. Cl.[4] .................. G01C 3/08; F42C 13/02
[52] U.S. Cl. .................... 356/5; 102/213; 342/68; 342/166
[58] Field of Search ............. 356/4, 5; 102/213, 214; 342/68, 166; 367/99

[56] References Cited

U.S. PATENT DOCUMENTS

| | | | |
|---|---|---|---|
| 2,703,399 | 3/1955 | Williams et al. | 102/214 |
| 3,321,630 | 5/1967 | Durig et al. | |
| 3,380,358 | 4/1968 | Neumann | 356/5 |
| 3,402,630 | 9/1968 | Blau et al. | 356/5 |
| 3,427,866 | 2/1969 | Weighart | 367/99 |
| 3,714,898 | 2/1973 | Ziemba | 102/213 |
| 3,900,261 | 8/1975 | Wingate | 356/5 |
| 4,022,132 | 5/1977 | Blomqvist et al. | 102/213 |
| 4,128,760 | 4/1977 | Del Signore, II | |
| 4,139,301 | 2/1979 | Chaborski | 356/5 |
| 4,162,052 | 7/1979 | Lamelot | |
| 4,181,431 | 1/1980 | Chaborski | 356/5 |
| 4,195,294 | 3/1980 | Reid | 102/214 |
| 4,245,558 | 1/1981 | Flaherty | 102/213 |
| 4,269,506 | 5/1981 | Johnson et al. | 356/5 |
| 4,388,528 | 6/1983 | Walter | |
| 4,413,905 | 11/1983 | Holzapfel | 356/5 |
| 4,518,253 | 5/1985 | Takahashi | 356/4 |
| 4,521,107 | 6/1985 | Chabroski et al. | 356/5 |
| 4,532,867 | 8/1985 | Mitchell | 102/213 |
| 4,556,313 | 12/1985 | Miller et al. | 356/4 |
| 4,733,609 | 3/1988 | Goodwin et al. | 102/213 |

Primary Examiner—Thomas H. Tarcza
Assistant Examiner—Linda J. Wallace
Attorney, Agent, or Firm—George H. Libman; James H. Chafin; Judson R. Hightower

[57] ABSTRACT

A proximity fuze system includes an optical ranging apparatus, a detonation circuit controlled by the optical ranging apparatus, and an explosive charge detonated by the detonation cirtcuit. The optical ranging apparatus includes a pulsed laser light source for generating target ranging light pulses and optical reference light pulses. A single lens directs ranging pulses to a target and collects reflected light from the target. An optical fiber bundle is used for delaying the optical reference pulses to correspond to a predetermined distance from the target. The optical ranging apparatus includes circuitry for providing a first signal depending upon the light pulses reflected from the target, a second signal depending upon the light pulses from the optical delay fiber bundle, and an output signal when the first and second signals coincide with each other. The output signal occurs when the distance from the target is equal to the predetermined distance form the target. Additional circuitry distinguishes pulses reflected from the target from background solar radiation.

7 Claims, 3 Drawing Sheets

PROXIMITY FUZE

The United States Government has rights in this invention pursuant to Contract No. DE-AC04-76D00789 between the United States Department of Energy and AT&T Technologies, Inc.

FIELD OF THE INVENTION

The present invention relates generally to proximity fuzes, and more particularly to an optical proximity fuze carried on board a fired or self-propelled projectile.

BACKGROUND OF THE INVENTION

In the art of weaponry, it is desired to cause a fired projectile, such as an artillery round, or other launched projectile, such as a self-propelled rocket, to explode at or near a target. The projectile is detonated by a device known as a fuze. There are three general ways in which a projected or self-propelled weapon is fuzed, viz., after penetration of the target, upon contact with the target or by fuzing at a predetermined proximity with the target. Post-penetration and contact fuzing are well established technologies which depend mostly upon mechanical sensors to determine position. Proximity fuzing is required for warheads which explode to form shaped charges such as slugs, fragments, or jets prior to contacting the target. The distance from the exploding projectile to the target to form the shaped charge is termed "standoff" and varies according to the type of weapon. Standoffs of up to 100 times the charge diameter are often needed for fragmentation delivery. Some kind of ranging device is needed on the projectile to control the proximity fuzing. Optical ranging devices carried on board projectiles are known but have features that are undesirable. For example, devices which employ separate lenses for transmiting light and for collecting light such as is found in cross beam sensor systems, are subject to errors due to triangulation effects and are inaccurate at distances greater than twenty times the lens separation distance or charge diameter. It would be desirable to provide an optical ranging device carried on board a projectile which is not subject to optical triangulation errors and can operate at greater than twenty times the charge diameter.

Pulsed laser ranging is a method for measuring distance and is based on the time required for a laser pulse to propagate to and reflect back from an object located a distance from the measuring device. It would be desirable to be able to use the principles of pulse laser ranging in a proximity fuze for a fired or self-propelled projectile.

SUMMARY OF THE INVENTION

Accordingly, it is a primary object of the present invention to provide a proximity fuze carried on board a projectile and employing the principles of pulsed laser ranging.

Another object of the invention is to provide an optical ranging device which is not subject to triangulation errors.

Additional objects, advantages, and novel features of the invention will be set forth in part in the description that follows and in part will become apparent to those skilled in the art upon examination of the following or may be learned with practice of the invention. The objects and advantages of the invention may be realized and attained by means of the instrumentalities and combinations particularly pointed out in the appended claims.

To achieve the foregoing and other objects, and in accordance with the purposes of the present invention as described herein, a system is provided for proximity fuzing of a projectile by an optical ranging apparatus carried on board the projectile. The optical ranging apparatus generates a detonation signal when the projectile is at a predetermined distance from a target. Detonation circuitry and an explosive charge are also carried on board the projectile, and the explosive charge is detonated when the projectile is at the predetermined distance from the target.

In accordance with another aspect of the invention, an optical ranging apparatus is provided which includes a pulsed laser diode for generating light pulses and a lens for directing the target ranging light pulses to the target and for collecting light pulses reflected from the target. An optical delay means, preferably an optical fiber of measured length, receives the optical reference pulses for delaying the optical pulses to correspond to a predetermined distance from the target. Electrical circuitry provides a signal depending upon the light pulses reflected from the target. The circuitry also provides a signal depending upon the light pulses from the optical delay, and the circuitry also provides an output signal when the signals from light pulses reflected off the target either precede or coincide in time with the signals from the light pulses from the optical delay means.

Within the proximity fuze system of the invention, the transit time of the laser pulse that travels from the system to the target and reflects back from the target to the system, termed the "target ranging pulse", is measured. The transit time of a diverted portion of the target ranging pulse, used as a optical reference pulse in the system, is also measured. The optical reference pulse transit time correlates to a premeasured or precalculated transit time of a laser pulse travelling from the projectile to the target and back to the projectile corresponding to a preselected standoff distance. The target ranging pulse transit time is compared with the standoff reference pulse transit time, and circuitry in the system determines whether the transit time of the target ranging pulse is less than or equal to the transit time of the standoff reference pulse.

When the target ranging pulse transit time is greater than the standoff reference pulse transit time, the projectile is farther from the target than the preselected standoff distance. As the projectile approaches the desired standoff distance from the target, the difference between the target ranging pulse transit time and the standoff reference pulse transit time decreases. When the distance of the projectile from the target is equal to the desired standoff, the target ranging pulse transit time and the standoff reference pulse transit time coincide.

Within the system of the invention, the comparison between the target ranging pulse transit time and the standoff reference pulse transit time is used to control a fuzing or detonation circuit which causes an explosive charge to be detonated and the projectile to explode.

The preferred laser source radiates at a wavelength that does not overlap with the optical background wavelengths of the target. The targets with which the proximity fuze of the invention are typically used operate at normal temperatures. Such targets include tanks having skin temperatures near 300 degrees K. The spectral emittance of targets near 300 degrees K. is very low in the wavelengths below 3 microns. Therefore, the preferred laser source radiates at a wavelength less than 3 microns. A GaAs laser diode (emitting at a wavelength of 0.905 microns) is a suitable laser source for the proximity fuze of the invention.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF A PREFERRED EMBODIMENT OF THE INVENTION

Figure 1:
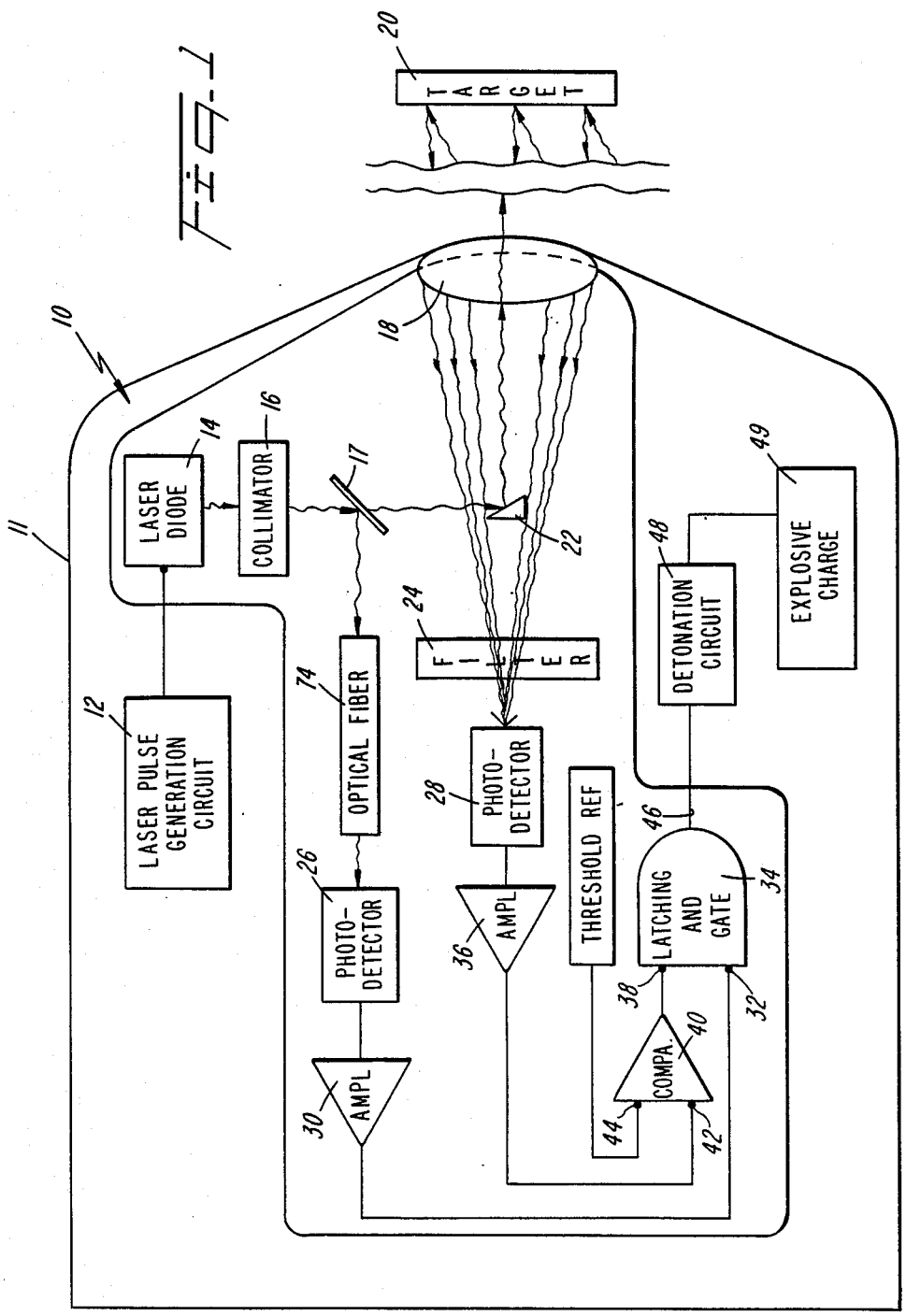
FIG. 1 is a schematic diagram of a proximity fuze employing a constant electrical reference signal representing background radiation.

With reference to the drawings, and more particularly to FIG. 1, there is disclosed a preferred embodiment of the proximity fuze system 10 of the present invention housed on board a projectile 11. In the system 10, an electronic pulsing circuit 12 causes a GaAs laser diode 14 to emit pulses of highly divergent laser light. In order to collimate the optical power and still maintain small dimensions, a collimator 16 preferably has a short focal lenght lens. The collimator 16 can be a fiber coupling sphere which has a small size (5.0 mm) and a short focal length (0.25 mm from surface).

A single interfacing lens 18 directs laser light from the system 10 to the target 20 and collects light reflected from the target 20 back to the system 10. To capture maximum power from a reflected light pulse, interfacing lens 18 has a large diameter.

The collimator 16, a beam splitter 17, and a prism 22 are located, respectively, between the laser diode 14 and the interfacing lens 18. The prism 22 has an aluminized hypotenuse which forms a mirror surface and which reflects the collimated laser pulse. The prism 22 serves to align the transmission axis through the interfacing lens 18 with the reception axis of the lens. Preferably, the interfacing lens 18 and other light collecting optical elements include an IR anti-reflective coating on the optical components. Spectral filtering of the light collected by the interfacing lens 18 by filter 24 is necessary to overcome the interfering effects of background solar irradiance. The solar constant, which is the value of solar spectral irradiance integrated over the spectrum of solar emission (0.1-20.0 microns), varies between 13 mW/cm$^2$ and 100 mW/cm$^2$ depending on the time of day, atmospheric absorption, zenith angle, and elevation. Because the minimum value of solar illumination, viewed directly or by specular reflection, would saturate any photodetector not employing spectral filters, extremely narrow band spectral filters are used to cover the reflected light photodetector.

There are two photodetectors in the system 10 shown in FIG. 1. Optical reference photodetector 26 detects the reference light pulse. The reflection photodetector 28 detects the reflected range pulse that has returned to the system 10 after being reflected from the target 20. Both photodetectors in the system 10 have maximum responsivity in the near infrared region (0.9 micron) to detect the reflected pulse. The range pulse is a high speed and low energy pulse, and the photodetectors have high responsivity to low power at high speed and a high slew rate. The rise time of the two detectors are closely matched so that a delay due to the detectors is not introduced in the signal path. Because the rise time of a photodetector is a function of the size of the photosensitive area, in the embodiment of the invention shown in FIG. 1, the photodetector area of reflection photodetector 28 is approximately 2 mm$^2$. A narrow band spectral filter 24 placed in front of the detector reduces interfering ambient illumination significantly. A bandpass filter centered at 904 nm with full width half maxima (FWHM) passband on the order of 10 nm may be used to effectively filter out interfering solar radiation and at the same time permit the reflection photodetector 28 to operate without being saturated.

The output of the optical reference photodetector 26 is fed to first amplifier 30, and the amplified optical reference signal is fed to the first input 32 of latching logical AND gate 34. The pulse from the optical reference photodetector 26 has an inherent or selectable delay and opens a time window in the latching AND gate 34. Resolution of the range data can be improved simply by making the latch window smaller. Edge triggering allows the leading transient of the pulse to create the time window; and in this manner, the system 10 will not vary with a varying pulse width.

A variable standoff can be effected by controlling the length of the time delay for the electrical signal representing the light from the beam splitter 17 to reach the latching AND gate 34. The light from the beam splitter 17 first travels through optical fiber 74 before impinging upon the optical reference photodetector 26 which signals the latching AND gate 34. The variable standoff is effected by varying the length of the optical fiber 74. The use of a variable length optical fiber 74 to vary the standoff is more advantageous than varying the standoff by varying an electronic timing source. Propagation delay through an optical fiber will not change with time due to aging. However, with an electronic timing source, the passage of time will subject the electronic timing source to aging and cause undesired changes in electronic propagation timing.

The output of the reflection photodetector 28 is fed to second amplifier 36, and the amplified reflection signal is ultimately fed to the second input 38 of the AND gate 34 through an intervening comparator circuit 40.

The amplified output of the reflection photodetector 28 is fed to the first input 42 of the comparator circuit 40. The second input 44 of the comparator circuit 40 receives a constant electrical reference signal which is related to the amount of background illumination present, so that the effect of the background illumination is cancelled. More specifically, the background light can be sampled between pulses, and the threshold is updated with respect to each pulse so that slowly occurring changes in light level (e.g. from passing from shade to sunlight) do not cause false triggering. The comparator 40 is relatively fast-acting and does not introduce appreciable delay in transmission of the reflection signal therethrough. When the reflection signal received by the fast acting comparator 40 is greater that the electrical reference signal representing the background radiation, the comparator 40 produces an output signal which is applied to the second input 38 of the AND gate 34.

When the signal from the comparator 40 representing the laser pulse reflection is applied to the second input 38 of the AND gate 34 at the same time that the amplified optical reference signal is applied to the first input 32 of the AND gate 34, the output 46 of the AND gate 34 latches to produce a steady output signal. The latched output signal can then be used to trigger a fuze or detonation circuit 48 on board projectile 11. The detonation circuit 48 detonates explosive charge 49 housed in the projectile.

Suitable laser diodes 14 are made by M/A-COM and are designated as being in the LD-60 series which have rated peak output power up to 25 watts. Due to heating caused by large forward conduction currents, the diodes have a maximum duty factor of 0.1%. The peak power of the pulse spread over a duty factor of 0.1% leads to 25 mW of continuous power. Emission of light from the diode occurs only after the threshold current is exceeded, and emission intensity is highly dependent upon forward bias.

The laser diode 14 may be pulsed rather than being operated continuously. The power output of the laser diode 14 may be limited by the maximum duty cycle of the device i.e., the ratio of maximum pulse width to minimum pulse period that the diode can tolerate. For example, a 100 kHz repetition rate would limit the pulse width to 10 ns if the duty cycle is 0.01% as is typical. The duty cycle limitation does not constrain the effectiveness of the proximity fuze because the pulse width is a relatively unimportant parameter.

One measure of the performance of the ranging system is the degree of range resolution. Range resolution is determined by the leading edge of the pulse and employs edge detecting digital logic components. Thus, pulse width can be varied to meet duty cycle for a given repetition rate. Worst case range resolution can be determined by assuming that the digital logic components judge the coinciding of reference and reflection pulses randomly along the rising edges of the optical pulses. Rise time of the optical flux of a high speed diode is typically 0.5 ns which leads to a worst case range resolution of only 6 inches.

Another measure of the performance of the ranging system is the likelihood of false detection. Theoretically, a pulse could return after a multiple number of pulse periods and thereby cause a false detection. To solve this problem, if the probability of false detection were too high, the repetition rate could be increased and multiple coincident returns counted to verify actual coincidence of optical reference and reflection pulses. For example, a projectile velocity of 1000 m/s (150 micro-sec./6 inches) and a repetition rate of 10 microsec. (100 kHz) would allow 15 pulses indicating coincidence to be counted during the time that the projectile took to tavel 6 inches (the resolution limit).

Another and preferred technique ro reduce false detection is to reduce the pulse repetition rate to a minimum. This condition is met when the pulse repetition rate is slow enough such that the projectile will move between pulses an amount equal to the desired system resolution. Thus, if a projectile travelling at 1,000 m/s is to have 6 inch standoff resolution, then it must pulse at least every 152 microseconds. The first multiple ambiguity error would occur at 304 microseconds afetr each pulse. Thus, to false trigger due to multiple pulse ambiguity error, the projectile must be about 28 miles away from the target and no closer. From these considerations, it is apparent that pulse repetition rate can be increased to gain resolution without penalty until the first multiple pulse ambiguity distance is less than the projectile flight distance. This technique protects the projectile from such passive jamming strategies as retro reflective paints and devices.

A suitable photodetector for both the optical reference photodetector 26 and the reflection photodetector 28 is an RCA photodiode/preamplifier in the C30950 series whose optical sensitivity peaks at 900 nm. The responsivity of the photodetector is $4.9 \times 10^4$ V/W at 900 nm with a rise time of 2 ns when AC coupled into a 50 ohm load. A 50 mV output signal would require just over 1 micro W of incident power given the responsivity. These detectors are very fast for the near infrared region. A reverse bias supply of 225 volts is needed for this unit along with an amplifier bias of + or −12 volts.

The frequency response of any amplifier is drastically reduced when forced to operate outside of its linear region. Responsivity of the detector is therefore limited so that typical return signals from the target 20 do not saturate the amplifier. The linear region of the RCA detector + or −0.7 volt with a DC offset voltage of −0.8 volt.

Another consideration in obtaining optimum detector and amplifier response is the maintenance of the detector and amplifier at appropriate operating temperatures. If the operating temperature is above or below optimum temperatures, the circuits will not perform optimally.

The latching AND gate 34 and the comparator 40 may be implemented together as a combined integrated circuit such as the following comparator/latch: GigaBit 10G021A. In using the comparator/latch and in order to achieve adequate accuracy in range measurement, the circuitry responding to the coincidence of the reference pulse and the reflection pulse is preferably triggered on the rising edge of the pulse. A latch which is not edge triggered allows data transfer any time the clock is at the high state; this length of time is too long and will allow undesirable introduction of errors in range measurement. The GigaBit 10G021A comparator/latch chip clocks on the edge of the pulse and, due to its frequency response, exhibits a very short range gate.

Figure 2:
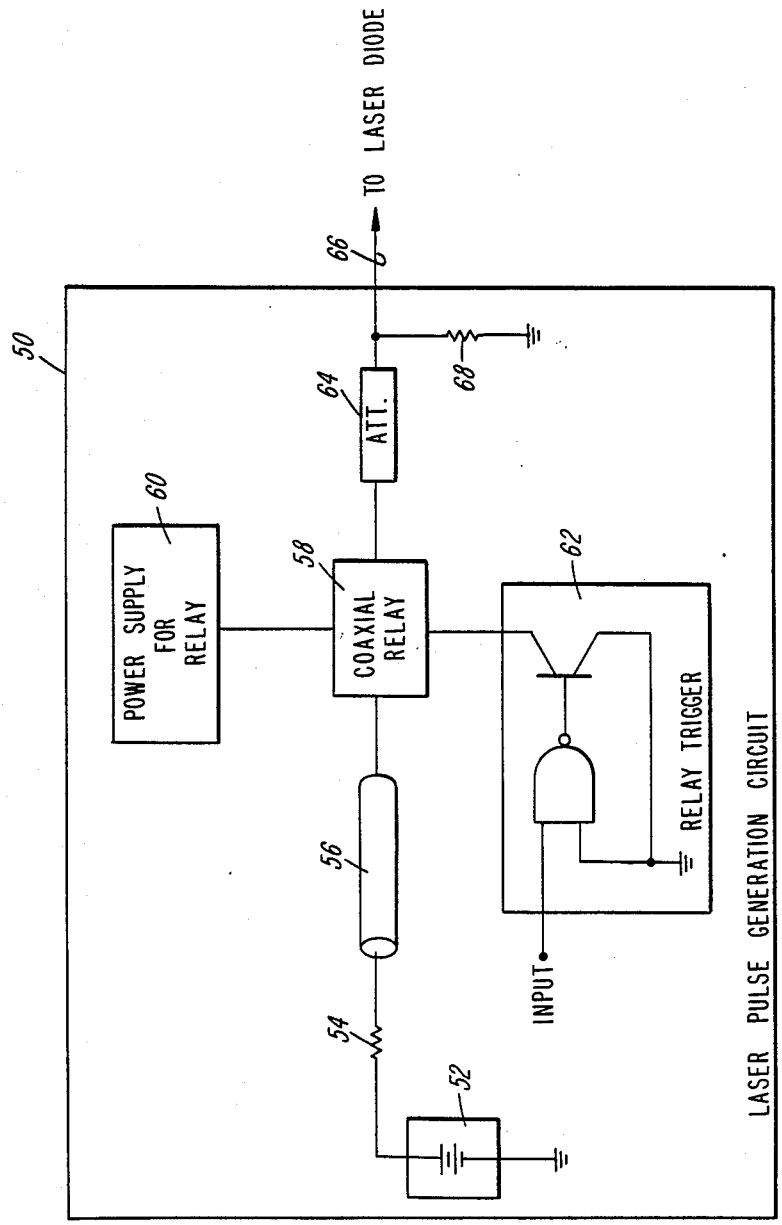
FIG. 2 is a schematic diagram of a preferred laser pulse generation circuit.

In FIG. 2, a suitable laser pulse generation circuit 50 includes DC source 52, 100 M ohm resistance 54, 50 ohm coaxial cable 56, 50 ohm coaxial relay 58, power supply 60 for the relay, a relay trigger circuit 62, 50 ohm attenuator 64, and output lead 66 to the laser diode 14, and a 50 ohm output termination resistance 68.

Generation of fast pulses with sub-nanosecond rise times is obtained using a charged transmission line including cable 56 initially charged through the high impedance DC source 52 and 54. The relay 58 consists of a solenoid operated switch powered by a 26 volt supply 60 and triggered by a TTL relay driver 62. When the 50 ohm relay switch closes (it acts as a bounceless switch), a positive voltage is applied to the 50 ohm output termination resistance 68. At the same time that the positive voltage is applied to the output lead 66, a negative voltage is transmitted along the coaxial cable 56 towards the DC source 52. When the negative voltage encounters the 100 M ohm termination resistance 54, a reflected voltage (from a positive reflection coefficient) is transmitted back towards the output lead 66. The negative voltage essentially cancels the positive voltage originally applied to the output termination resistance because the output resistance is small compared to the magnitude of the resistance of the source. The result is a pulse whose width is determined by twice the electrical length of the coaxial cable.

Ideally, the elements in the circuit in FIG. 2 are purely resistive, but in practice, stray capacitance will ultimately limit the rise time. The resultant pulse as seen through a 600 Mhz amplifier has a rise time of approximately 0.35/fc where fc is the −3dB cutoff frequency. Generally speaking, the theoretical rise time of a pure pulse can be estimated by subtracting the rise time of the amplifier from the observed rise time of the pulse.

Once the laser light pulse leaves the system 10 and is on its way to the target 20, there are a number of factors which affect the amount of reflected light that reflects off the target 20 and returns to the system 10. For example, the surface conditions of the target 20 can influence the return power of the laser pulse. When the target 20 cross-section is less than the laser beam area at the target 20, then the target 20 cross-section limits the maximum power that can be reflected from the target 20. Other aspects of the target 20 which affect the amount of light pulse that is reflected back to the system 10 include the angle of the target 20 to the pulse beam (the angle of incidence) and the reflectivity of the surface of the target 20.

Figure 3:
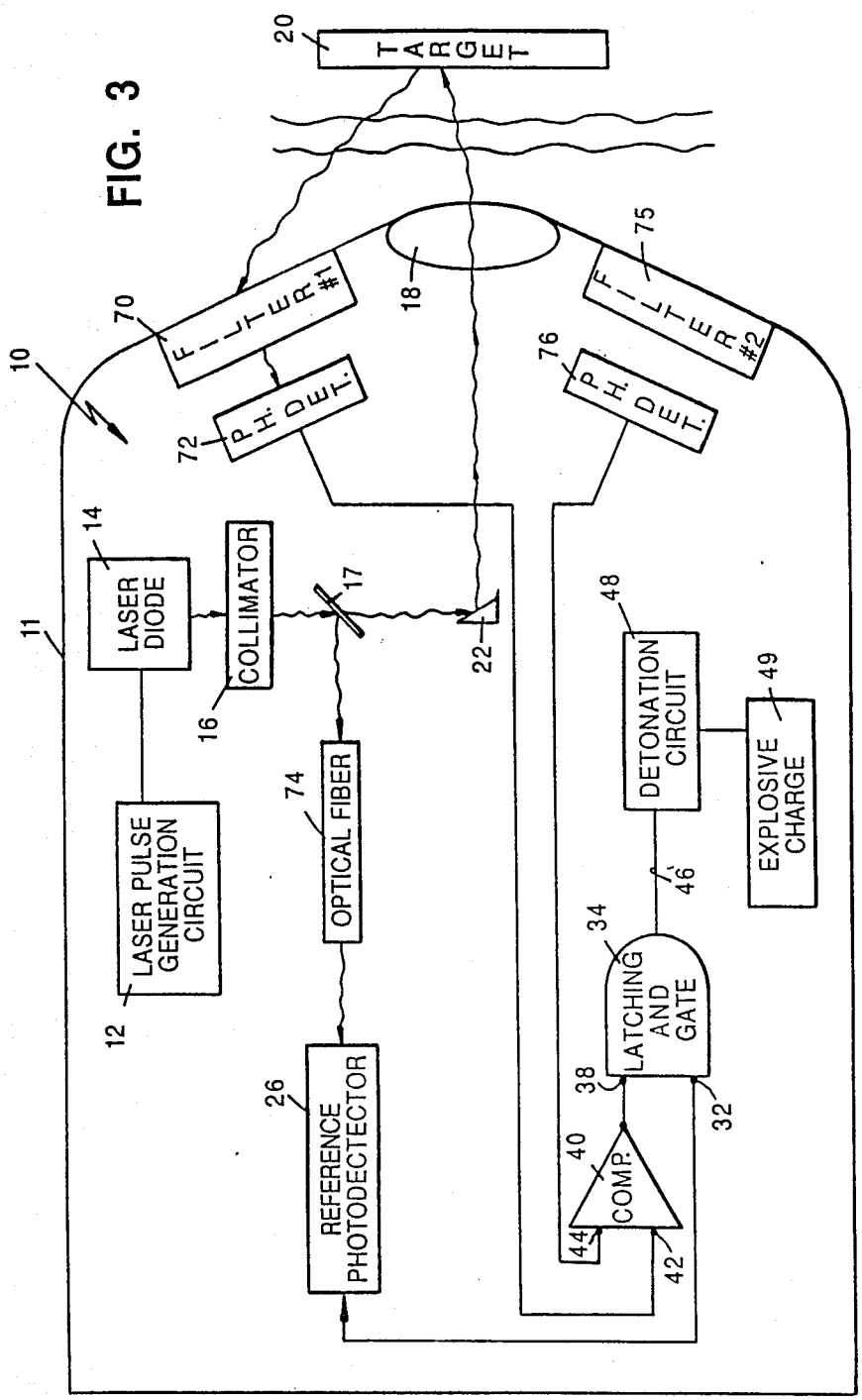
FIG. 3 is a schematic diagram of a proximity fuze employing two reflection photodetectors for distinguishing a reflected pulse from background radiation.

In FIG. 3, the proximity fuze system employs two filters and two reflection photodetectors for distinguishing a reflected pulse from background radiation. The first reflection filter 70 filters light at a first wavelength and directs the first filtered light to a first reflection photodetector 72. The second reflection filter 75 filters light at a second wavelength and directs the second filtered light to a second reflection photodetector 76. A gate 34 having an input 38 for receiving a signal depending upon the light pulses filtered through the first and second filters and another input 32 for receiving the signal corresponding to the predetermined distance from the target 20 provides an output signal on output line 46 when the signals to said first and second gate inputs coincide.

A comparator circuit 40 located between the first and second reflection photodetectors and the gate means has a first input 42 connected to the first reflection photodetector 72 and a second input 44 connected to the second reflection photodetector 76. An electrical output signal provided from the comparator to the first input of the gate means distinguishes background light from light reflected from the target. Background light is assumed to be solar radiation, and the two detectors will have a constant power output ratio due to solar radiation until one detector senses pulsed light reflected from the target. Only one detector (photodetector 72 in FIG. 3) will be affected by the pulsed light reflected from the target 20 because the two detectors will be physically separated and not capable of receiving the same reflected pulse simultaneously. When such is the case, the comparator 40 will send a signal to the first input 32 of the gate 34. The two separated detectors are preceded by first and second light filters 70 and 75, respectively, which filter different light wavelengths. In FIG. 3, input 32 of the gate 34 is connected to an optical reference photodetector for providing a signal depending upon the light pulses from an optical reference bundle 74. The reference signal corresponds to a predetermined distance from the target.

The reflected signal that is returned to the system 10 can be interfered with by extraneous sources of radiation. For example, countermeasure flares could be used or naturally occurring solar radiation could interfere.

In summary, numerous benefits have been described which result from employing the principles of the invention. With the invention a proximity fuze system is provided which uses the principles of laser pulse ranging. Background solar radiation is compensated for so as not to interfere with target detection. Rapid laser pulsing is provided by the laser pulse generation circuit.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

Instead of using a fiber coupling sphere as a collimator 16 for the laser beam, multiplement collimators of the type by Melles-Griot can be used. Another suitable collimator is a Fresnel lens.

Instead of using an mirrored prism 22 between the coupling sphere and the interfacing lens 18, the prism 22 could be replaced by a fiber bundle. A fiber bundle would allow the laser diode 14 to be moved to clear any nose cone that houses electronic components.

Instead of diverting a portion of the ranging laser pulse to the optical reference portions of the system 10, two separate laser sources can be used, one for ranging and one for optical reference.

Although an optical fiber is disclosed as being a means for generating an optical reference pulse, an active electronic circuit that is suitably calibrated can be used for the same purpose.

Instead of using an AND gate 34 or equivalent to receive inputs representing standoff reference and target 20 reflection light pulses, the actual transit time for the reference light pulse can be measured and compared with a measurement of the actual transit time for the reflected light pulse. When the two time measurements are equal, a detonation circuit on board the projectile 11 can be triggered.

The electrical reference signal applied to the comparator can either be fixed or time-varying depending on the range of the signal to background ratio that is expected.

A low signal to background ratio requires maximum comparator sensitivity, and such a condition requires a reference signal that adjusts to the level of the background. Several methods of tying the electrical reference signal applied to the comparator to the background signal level are contemplated. Since the ratio of two wavelengths is constant for blackbody or solar emissions, in one such method, two matched detectors are spectrally filtered at two different wavelengths to produce a constant ratio under ambient illumination. This ratio could be used as a reference threshold. Laser reflections from the target would change the ratio and thus cause detection of the emitted pulse.

Another method to tie the reference signal applied to the comparator to the level of background signal employs a detector that spectrally filters out the signal wavelength and keeps the background (such as a notch filter). Such a filter would tie the reference signal to the ambient level.

Although the preferred embodiment described above employs a single interfacing lens 18 for both transmission of laser pulses from the system 10 to the target 20 and for receipt of the reflected light from the target 20 to the system 10, separate lenses can be used for sending and receiving the light pulses. Any triangulation effect errors that might be introduced into the ranging could be compensated for by appropriate calibration of the system.

Still another method to tie the reference signal applied to the comparator to the level of background illumination employs a detector having a larger area which is not physically capable or responding to a fast pulse. This aspect of the detector would tie the reference signal to the ambient illumination.

Although the circuits described herein have been described in terms of using a combination of individual circuit components, a single substrate can be used for integrating detectors, amplifiers, and detection logic.

What is claimed is:

1. Optical ranging apparatus comprising:
    laser light pulse means for generating a series of target ranging light pulses and optical reference light pulses;
    means for directing the target ranging light pulses toward a target;
    means for collecting light pulses reflected from the target;
    optical delay means for delaying the optical reference pulses a time corresponding to a predetermined distance of the apparatus from the target;
    converter means for providing electrical signals corresponding to the light pulses reflected from the target, and signals corresponding to the light pulses from the optical delay means; and
    circuitry means for providing an output signal only when the signals corresponding to light pulses reflected from the target coincide with the signals corresponding to light pulses from the optical delay means, said output signal occurring only when the distance from the target is equal to the predetermined distance from the target.

2. The optical ranging apparatus described in claim 1 wherein:
    said converter means includes reflection and optical reference photodetectors; and
    said circuitry means includes gate means having a first input for receiving the signal corresponding to the light pulses reflected from the target and having a second input for receiving the signal corresponding to the predetermined distance from the target, said gate means providing an output signal only when the signals to said first and second gate inputs coincide.

3. The optical ranging apparatus described in claim 2, further comprising:
    a comparator circuit located between said reflection photodetector and said gate means,
    a first input of said comparator circuit being connected to said reflection photodetector,
    a second input of said comparator circuit being connected to a source of an electrical reference signal representing background radiation,
    said comparator circuit providing an electrical output signal to the first input of said gate means when the signal from the reflection photodetector exceeds the signal representing the background radiation.

4. The optical ranging apparatus described in claim 2 wherein said laser light pulse means includes light splitting means for splitting a single source of generated light pulses into target ranging pulses and optical reference pulses.

5. The optical ranging apparatus described in claim 1 wherein said circuitry means includes means for providing the output signal only when the signal corresponding to the leading edge of the pulse from the target coincides with the signal corresponding to the leading edge of the delayed reference pulses.

6. The optical ranging apparatus described in claim 5 wherein said means for providing comprises a latching gate.

7. A proximity fuze apparatus comprising:
    a projectile containing optical ranging apparatus comprising:
        laser light pulse means for generating a series of target ranging light pulses and optical reference light pulses;
        means for directing the target ranging light pulses toward a target;
        means for collecting light pulses reflected from the target;
        optical delay means for delaying the optical reference pulses a time corresponding to a predetermined distance of the apparatus from the target;
        converter means for providing electrical signals corresponding to the light pulses reflected from the target, and signals corresponding to the light pulses from the optical delay means; and
        circuitry means for providing an output signal only when the signals corresponding to light pulses reflected from the target coincide with the signals corresponding to light pulses from the optical delay means, said output signal occurring only when the distance from the target is equal to the predetermined distance from the target:
    detonation means carried by said projectile and responsive to said output signal; and
    an explosive charge carried on said projectile responsive to said detonation means.

* * * * *